(No Model.)
C. F. MANSUR.
SELF REGULATING FEEDER FOR SACCHARINE LIQUIDS.
No. 258,454. Patented May 23, 1882.
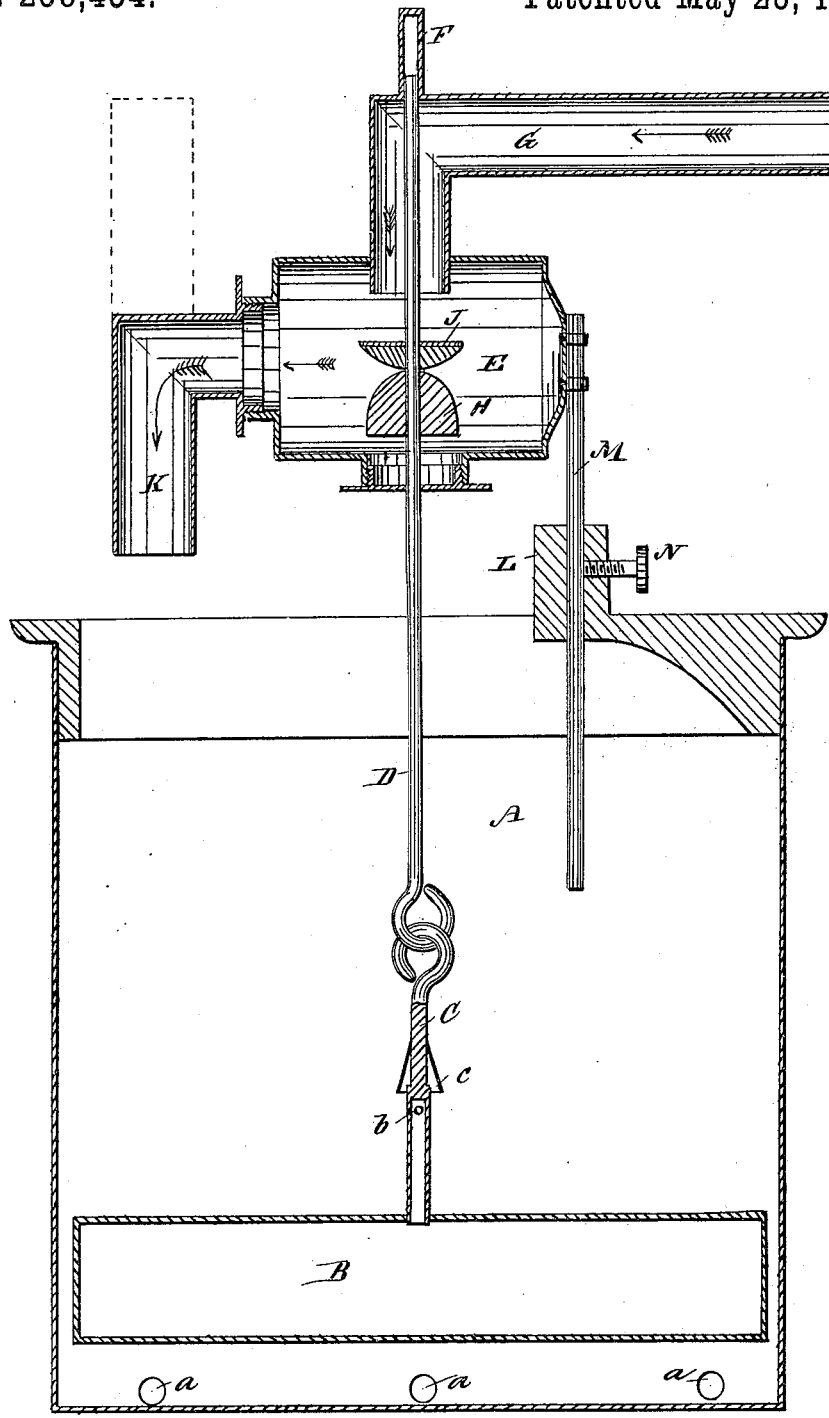
WITNESSES:
Theo. G. Hoster
C. Sedgwick
INVENTOR:
C. F. Mansur
BY Munn & Co
ATTORNEYS.

UNITED STATES PATENT OFFICE.

CHARLES F. MANSUR, OF WESTON, VERMONT.

SELF-REGULATING FEEDER FOR SACCHARINE LIQUIDS.

SPECIFICATION forming part of Letters Patent No. 258,454, dated May 23, 1882.

Application filed February 13, 1882. (No model.)

*To all whom it may concern:*

Be it known that I, CHARLES F. MANSUR, of Weston, in the county of Windsor and State of Vermont, have invented a new and Improved Self-Regulating Feeder for Saccharine Liquids, of which the following is a full, clear, and exact description.

The object of my invention is to provide a new and improved device for regulating the flow of saccharine liquids from the reservoir to the evaporating-pan, in which the sap or other saccharine solution is boiled down or concentrated.

The invention consists in a feed-regulating valve contained in a box at the end of the feed-pipe, which valve is operated by a rod having a float at its lower end, this float resting on the surface of the liquid in the pan, and thus raising and lowering the valve as the level of the liquid in the pan rises and falls.

The invention further consists in a rounded block rigidly mounted on the float-rod and supporting the valve, which is loosely mounted on the float-rod, so that this valve can oscillate and adjust itself to fit closely against the end of the feed-pipe.

The invention further consists in devices for supporting the valve-box and for adjusting the same vertically according to the depth of the liquid in the pan.

The invention further consists in the construction and arrangement of details and parts.

Reference is to be had to the accompanying drawing, forming part of this specification, in which a cross-sectional elevation of my improved self-regulating feeder is shown.

A vessel, A, which may be cylindrical or have any other suitable shape, is placed in the evaporating-pan, so that the liquid in the pan can pass into the vessel A through the apertures *a* at the bottom of this vessel A.

A float, B, preferably consisting of a closed metal box, is supported by means of a hook, C, from a hooked rod, D, which passes through a valve-box, E, above the vessel A. The upper end of the rod D passes into a tubular socket, F, closed at its upper end and projecting upward from the pipe or tube G, which conveys the saccharine liquid from the reservoir to the evaporating-pan. The lower part of the hook C is hollow and in communication with the hollow float B. This hollow part of the hook is provided with an aperture, *b*, which is protected by a conical cap, *c*, attached to the hook-tube C above this aperture *b*, which is the air-vent for the float.

On the rod D a block, H, with a rounded upper surface is rigidly mounted within the valve-box E. On this block H the lower rounded surface of a valve, J, loosely mounted on the rod G, rests, which valve is provided on its upper surface with a cushion of rubber or other suitable material, so that this valve will fit closely on the rod D and on the lower end of the pipe G, which projects into the valve-box E from above. This valve J is loosely mounted on the rod D, so that it can turn and swing and automatically adjust itself to fit closely against the end of the tube G. The valve rests on the rounded block H, which is rigidly mounted on the rod D. From the valve-box E the liquid passes through a pipe, K, into the evaporating or condensing pan; or, if desired, the pipe K can be turned upward to conduct the liquid into a heater, and from there into the pan. The vessel A is provided with a strong top rim, provided with an internal projection, L, provided with a vertical aperture, through which a rod, M, passes, carrying at its upper end the valve-box E. This rod M can be locked in any desired position by means of a binding-screw, N, in the projection L of the rim of the vessel A.

The operation is as follows: The saccharine liquid flows from the reservoir through the pipe G into the valve-box E and from there into the evaporating-pan. As the liquid rises in the pan the float B rises accordingly as the liquid passes into the vessel A through the apertures *a*. If the float B rises, the rod D will be moved upward and the valve J will be pressed on the end of the pipe G, thus closing the same and interrupting the flow of the saccharine liquid. If the liquid in the pan boils down, the float B will descend, whereby the valve J is lowered, permitting the liquid to flow from the pipe G again. In this way the supply of the liquid is regulated automatically according to the quantity of liquid in the pan. There are no fine adjustments and no parts that become clogged or out of order. I have found that if a hollow float is not provided with an air-vent it is apt to become filled with sugar and water, so as to be inoperative. For that reason I have provided the air-vent $b$ and have protected it by means of the cap $c$.

By means of the rod M and the screw N the valve J can be adjusted to close the end of the pipe G at any desired depth of the liquid in the evaporating-pan.

Having thus described my invention, I claim as new and desire to secure by Letters Patent—

1. In a self-regulating feeder, the combination, with the feed-pipe G and the valve-box E, of the valve J, loosely mounted on the rod D, the supporting-block H on the rod D, and the float-supporting rod D, substantially as herein shown and described, and for the purpose set forth.

2. In a self-regulating feeder, the combination, with the feed-pipe G and the valve-box E, of the valve J, the block H, the rod D, and the float B, substantially as herein shown and described, and for the purpose set forth.

3. In a self-regulating feeder, the combination, with the feed-pipe G and the valve-box E, of the valve J, the block H, the rod D, the float B, and the vessel A, containing the float and provided with apertures $a$ for the entrance of the sap or saccharine liquid, substantially as herein shown and described, and for the purpose set forth.

4. In a self-regulating feeder, the combination, with the feed-pipe G, of the valve-box E, the adjustable supporting-rod M, the valve J, the rod D, the float B, and the vessel A, substantially as herein shown and described, and for the purpose set forth.

5. In a self-regulating feeder, the combination, with the feed-pipe G, the valve-box E, the valve J, and the rod D, of the float B and the hollow suspending-hook C, provided with an air-vent, $b$, substantially as herein shown and described, and for the purpose set forth.

6. In a self-regulating feeder, the combination, with the feed-pipe G and the float-rod D, of the rounded block H, rigidly mounted on the rod D, and the valve J, loosely mounted on the rod D and resting on the block H, which valve has a layer of rubber on its upper surface, substantially as herein shown and described, and for the purpose set forth.

7. In a self-regulating feeder, the combination, with the feed-pipe G and the valve-box E, of the valve-supporting and float-carrying rod D and of the guide-socket F on the pipe G, substantially as herein shown and described, and for the purpose set forth.

CHARLES FRANKLIN MANSUR.

Witnesses:
ASA G. FOSTER,
ALVARO F. PECK.